United States Patent Office 2,871,235
Patented Jan. 27, 1959

2,871,235
PROCESS FOR OBTAINING POLYSACCHARIDE MATERIAL FROM PLANTS OF THE GENUS "CECROPIA"

Vladimir Jan Hlousek de Jilovice, Rio de Janeiro, Brazil

No Drawing. Application August 12, 1953
Serial No. 373,881

Claims priority, application Brazil August 29, 1952

17 Claims. (Cl. 260—209)

The importance of uronic acids as constituents of the fibrous structures of human body tissues has been well known by the scientific work of Mayer, Jaffé, Neuberg, Cammidge, Tollens, Hildebrandt, Stern, Salkowski and others.

The uronic acids take active part in the formation, e. g., of the cartilages of tendons, articulation capsules or capsular ligaments, nervous filaments, blood vessel walls and intercellular uniting tissue and may be detected in all connective tissues which function, in the human body, as structural unity of the tissues and also as desintoxicating agents for the liver and kidneys. A great number of endogenous and exogenous toxics are rendered innocuous by the union with uronic acids within the human body and are eliminated in such condition by the urine.

The double function of these acids in the human body raises the question as to the possible active function of the same in the evolution of certain illness and in immunology. A great deal of scientific work has been done in this connection, with satisfactory results. Following bibliography may be cited in this connection, such as: Lancet 451, 1947; J. Biol-Chem. 70: 397, 1926; Soc. Exper. Biol. Med. 30: 636, 1932–33; J. of Biol. Chem. 171, 507, 1947; Bacter., Rev. 6, 197, 1942; Ber. 75, 1469, 1942; J. of Biol. Chem. 179, 1213, 1949; Mitt. Chem. 82, 380, 1951 and some others.

As new sources of uronic acids, preference is given to vegetable raw materials, as it is well known that there are great difficulties in the obtention of sufficient amounts of the same by synthesis, as well as from animal raw materials, or from chemical compounds such as the polysaccharides which are chemically related to them. The latter may yield said acids by suitable processes, as has been confirmed by the work of Mors and Ribeiro who have detected the presence of mannuronic acids in the mucilage of the stipules of the species *Cecropia adenopus*.

Now I have ascertained that not only the stipules of said plant but also other parts of the same, as well as other species of the same genus may yield, a polysaccharide which upon acid hydrolysis, will furnish free aldobiuronic acids which may be isolated in the form of the corresponding alkali or earth-alkali metal salts or the salts corresponding to alkaloids. The percentage or yield of the extraction will vary according to the parts of the plants used and also according to the species of plants used for the extraction. The mannuronic acids may be isolated from the polysaccharide in the form of complex polymers.

The conventional methods already used for the extraction of uronic acids and the isolation thereof are not applicable to the present invention in view of the poor yield obtained with the same and for the purpose of the present application improved methods had to be devised. The desired polysaccharides are very impure and have to be subjected to special methods of purification.

The plants suitable for the extraction of the polysaccharides which upon chemical processing may yield aldobiuronic acids have been now identified as those corresponding to the following botanical classification: Class—Dicotyledonae; sub-class—Ceripetalae; series—Urticineae; family—Artocarpae; group—Cenocephalae; genus—Cecropia; species—*peltata, hololeuca, adenopus, palmata, scisdaphylla, leucocomo, cinerea, surinamensis, membranacea, concolor, carbonaria* and probably others.

The parts of the plant which are usuable for the extraction of the polysaccharide and the corresponding aldobiuronic acids are: the trunk (the hemicellulose contained therein), the fruits, stipules, sprouts or buds, white and grayish masses contained in the internal cavities of the trunks and the germ or mucilage exuded from lesions of the tree. The extraction may be carried out, using the plants right after harvesting, in fresh state or, when this is not feasible, after a mild drying in an oven, after a treatment (known per se) in order to avoid a harmful enzymatic action or of the oxydases which are very abundant on the indicated plants.

The external bark shall be removed before effecting the extraction and they may be used for recovering other active materials. The parts of the plants are cut in small pieces and thereafter ground in a mill until a pasty mass is obtained in the case of fresh plants or a pulverulent mass in case dried plants are used.

The polysaccharide obtained by the extraction and isolation has the following characteristics: it is a white, opalescent, solid mass, which is easily pulverized, soluble in water, precipitating upon the addition of alcohol and ether. In this state it does not reduce Fehling's reagent, but upon acid hydrolysis said reagent is reduced. The polysaccharide when heated with hydrochloric acid and phloroglucine, forms a red colouring which indicates the presence of uronic acids and pentoses. The tests for nitrogen are negative. By analysis, following the fractionation of the product, I have been able to ascertain that upon oxidation by nitric acid the same may be degraded up to mucic acid, obtainable in crystalline form. The acid hydrolysis of the product when completed yields the desired aldobiuronic acids in the form of a polymer with glucoside linking. The groups of two aldobiuronic acids linked together by means of a glucoside bridge may be found, one being formed by a molecule of fucose and a molecule of mannuronic acid and the other formed by a molecule of mannuronic acid and a molecule of galactose. These aldobiuronic acids form with alkalis the corresponding alkali salts and with alkaloids the corresponding salts of the alkaloids. The chemical methods for the identification of the products obtained by extraction and hydrolysis of the extracted products were applied according to the technique of Nelson, Crether, Link, Jonsburg, Dickson, Mors, Ribeiro, Zeisel and Clark. The invention will now be described with further details of the various steps of the same.

(1) *Extraction and isolation of the polysaccharide*

1000 grams of the pasty mass obtained by grinding of the stipules of *Cecropia adenopus* or *peltata*, for example, are subjected to repeated diffusion in distilled water, during a period of 6 hours, within a rotary drum or vessel, the product of diffusion being continuously heated to a temperature which does not exceed 100° C., nor be below 60° C. This diffusion process is repeated until the water used for the diffusion, tested by sulfuric acid does not give a gelatinous precipitate. The diffusion liquids are combined, cooled and centrifuged and then suction-filtered. The viscid filtrate of a yellowish color is vacuum evaporated to a final volume of 2 litres. The obtained liquid is blended with 50% of its volume with a mixture of kieselguhr and active carbon and heated to a temperature which does not exceed the boiling temperature. Then, the resulting mixture is chilled and filtered. The filtered liquid is introduced into 5 volumes of 96% ethyl alcohol with continuous stirring. A yellowish gelatinous substance will precipitate which is collected on a filter, dehydrated by repeated treatment with alcohol and ether and dessicated in vacuo over phosphorus pentoxide. The polysaccharide thus obtained in impure state is pulverized and introduced in at least 6 volumes of pure formic acid with initial stirring and then left standing for at least 20 hours at constant room temperature. Thereafter, the acid is separated, the substance is washed with distilled water and reprecipitated from alcohol. The precipitate is separated and now subjected to a fractional precipitation with ethyl alcohol, using alcohol of varying degrees of concentration in the range from 75 to 98%, e. g., at 80%, 85%, 90% and 96%, by means of heating and rapid chilling. Finally, the polysaccharide is subjected to a repeated dialysis in water against acidulated water in order to remove the content thereof in mineral salts, absorbed in colloidal form within the polysaccharide in amounts varying from 3% to 10%. By said dialysis which, if desired, may be followed by electro-dialysis, the polysaccharide is obtained in an almost pure condition on reprecipitation by alcohol and dehydration in vacuo over phosphorus pentoxide. A solid substance is obtained, which is of a white opalescent color, easily pulverized, soluble in water and precipitated by alcohol and ether. The yield amounts to 3%–20%, according to the particular plants or parts thereof which have been used.

(2) *Extraction and purification of the polysaccharide*

1000 grams of ground mass of Cecropia, e. g. of the species *adenopus*, is treated with a weak solution, such as 0.5% solution of hydrochloric acid, in 2 liters of distilled water with continuous stirring, at a temperature which does not exceed 60° C., during a period of at least 12 hours. Thereafter, the mixture is left standing during additional 12 hours, at room temperature. The hydrochloric acid solution is decanted, the residue is well washed and introduced into a weak solution of ammonia, e. g. one of 1%, where it is left standing for at least two days, after an initial stirring for two hours. In this manner a very viscid gray-yellowish solution is obtained which is separated from the residue by centrifugation and filtration. This solution is acidified by sulfuric acid, whereupon a gelatinous yellowish substance is precipitated from said solution. This substance is filtered off, washed with water and reprecipitated several times by means of absolute alcohol. To the resulting precipitate a diluted aqueous solution of chlor dioxide is added and the treatment is continued until a complete bleaching is obtained. Thereafter the precipitate is again treated with a fresh diluted solution of chlor dioxide in water for 24 hours and then the resulting mixture is purified by treatment with ethyl alcohol, yielding a white substance which is subsequently subjected to the further purifying steps already described in Example 1, especially fractional precipitation and dialysis. Thus a product is obtained which is similar to that obtained according to Example 1, showing the same properties, in a yield varying from 2 to 25%, according to the species and the parts of the plants used for the extraction.

(3) *Acid hydrolysis and obtention of the aldobiuronic acids*

800 grams of the solid, white, pulverized substance obtained by the processes described in Examples 1 and 2, are dissolved in water in order to obtain a clear solution. This solution is introduced into an aqueous, boiling solution containing, e. g., 2.5% of sulfuric acid, with continuous stirring, the acid hydrolysis requiring an average period of time of 48 hours. (The percentage of sulfuric acid may be lessened down to 1%, but the hydrolysis time period is corresponding prolonged.)

When the hydrolysis is completed, the mixture is cooled and, then, neutralized by the addition of 2900 g. of barium hydroxide, dissolved in distilled water, at a temperature not exceeding 40° C. The basic solution is cautiously introduced into the acid solution, taking care that the temperature shall not exceed 40° C. As the hydroxide will easily enter solution, there is then added in small portions, with constant stirring, a total of 400 g. of barium carbonate, suspended in water and with this the neutralization is completed, the neutralized mixture being heated to a temperature not exceeding 80° C. After this treatment has been completed, there is added to the still warm mixture, activated carbon together with kieselguhr and the temperature of the same is maintained at 60° C. on a water bath. Thereafter, the mixture is cooled, centrifuged, filtered and the residue is washed. By this filtration the insoluble barium salt of the hydrolizing acid is separated in conjunction with the non-hydrolyzed matter. The liquid portion is evaporated in vacuo to a volume of 2000 ml. In this way some additional impurities are removed and the remaining liquid is then subjected to a fractional precipitation by alcohol, described in the process of Example 1. The barium salt of the aldobiuronic acids is precipitated from absolute ethyl alcohol, after standing for a period of 24 hours. The precipitated salt is filtered off, purified several times by repeated reprecipitation and, finally, separated from alcohol and ether and dried in vacuo over phosphorus pentoxide.

The yield in barium salt of aldobiuronic acids is, approximately, 350 grams. The salt has a barium content of 27% (calculated=26.3%) and this salt has been identified as the barium salt of two aldobiuronic acids, united by a glucosidic link, the first aldobiuronic acid being formed by a molecule of galactose and a molecule of mannuronic acid, and the other aldobiuronic acid being constituted by a molecule of mannuronic acid and a molecule of methyl-pentose (calculated as being fucose).

The barium salt, obtained by this process is of yellowish color, soluble in water, precipitated by alcohol and forming stable, viscous solutions with water.

The chemical structure of the complex aldobiuronic acid was established in view of the corresponding barium salt as represented by following formula:

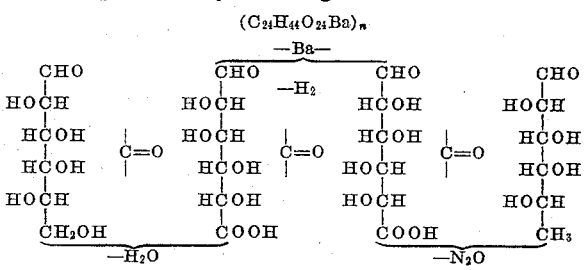

(4) *Obtention of alkaloid salts of the aldobiuronic acids*

1000 grams of the barium salt of aldobiuronic acids are dissolved in 3000 ml. of distilled water, heated to a temperature below the boiling point of the solution in which are, then, gradually introduced 3800 ml. of sulfonic acid I/N with constant stirring. The resulting mixture is introduced into 95% alcohol. In this way the insoluble barium sulfate formed is precipitated as well as the undecomposed barium salt of aldobiuronic acids. The next steps involve filtering, removing the precipitate, heating the filtered liquid at a temperature not exceeding the boiling point thereof and adding to the same a 95% ethyl alcohol solution containing a stoichiometric excess of the selected alkaloid (brucine, cinchonine, caffeine or others) for obtaining the corresponding alkaloid salt.

The obtained solution is concentrated at a low temperature, in vacuo, to a volume of approximately 2500 ml. and the alkaloid salt is precipitated in ethyl alcohol by chilling, after standing for a period of 24 hours. The product is repeatedly recrystallized, the excess of non-reacted alkaloid salt is further purified by means of the purifying coadjuvants already mentioned in the previous examples.

The obtained alkaloid salts are crystalline, with definite properties and constants, e. g., the aldobiuronic acid salt of brucine has a characteristic melting point at 148° C. (with decomposition). The alkaloid salts are, generally, hygroscopic and it is necessary to subject the same to a dehydration in high vacuum.

The yield averages 60% of the theorical value.

(5) *Obtention of derivatives of aldobiuronic acids by means of an oxidation of salts thereof*

59 grams of the barium salt of aldobiuronic acids, obtained according to the disclosure of Examples 1, 2 and 3, are dissolved in 600 ml. of water and the solution is cooled. To this solution is added another solution containing 100 grams of barium hydroxide dissolved in 1.200 ml. of ice cold water. The oxidation is effected at a temperature not exceeding 20° C., by means of a stream of oxygen, with constant stirring of the mixture. After a reaction period of about 20 hours, when 3,500 ml. (more or less) of oxygen have been taken up (calculated 2.73° ml.) the barium in excess is precipitated by means of a stream of carbon dioxide and the solution is filtered with the aid of clarifying agents already described in the foregoing examples.

The filtrate is vacuum evaporated until dry, yielding 25 grams of a yellowish residue. This residue is dissolved in 400 ml. of hot distilled water and in this solution 12 grams of the selected alkaloid (e. g. brucine) are introduced. Thereafter, the solution is cooled with constant stirring, the alkaloid in excess is separated and the remaining aqueous solution is completely dried in vacuo. The corresponding brucine salt recrystallizes from water after standing for several days. The yield in alkaloid brucine salt was 38 grams. This salt is further purified by the processes already disclosed in the foregoing examples, and showed a characteristic melting point of 152–154° C., with decomposition. The obtained salt is hygroscopic and is dried during 24 hours, at 75° C., in high vacuum. Other alkaloids may be substituted for the brucine, mentioned above.

Having now described the invention in detail, I do not want to limit the invention beyond the scope of the appended claims. Many modifications may be introduced into the same which are obvious to those skilled in the art.

What I claim is:

1. The process of obtaining a polysaccharide material from parts of plants of the genus Cecropia, which comprises extracting the same after it has been protected against the noxious action of enzymes and oxydases by diffusion at an elevated temperature not exceeding 100° C. in a medium consisting of a liquid selected from the group consisting of water and a weakly acidic aqueous solution, filtering the extract, precipitating the saccharide material from the filtrate by the addition of concentrated ethyl alcohol and finally drying the polysaccharide precipitate.

2. The process according to claim 1, in which said extraction is effected at a temperature ranging from 50° C. to 100° C.

3. The process according to claim 1, in which the extraction of parts of plants of the genus Cecropia is effected with a dilute solution of an acid followed by extraction with a dilute solution of an alkali, and the polysaccharide material is precipitated from the alkaline extracting medium by means of sulfuric acid, the recuperated precipitate being bleached by means of an aqueous solution containing a bleaching agent.

4. The process according to claim 1, in which the raw polysaccharide material thus obtained is further purified by treating the same with formic acid at room temperature, washing the residue and reprecipitating the polysaccharide by means of alcohol.

5. The process according to claim 1, in which the polysaccharide material is fractionally reprecipitated by means of ethyl alcohol of increasing concentration, in the range of 75% to 98%.

6. The process according to claim 1 comprising the further step of eliminating the colloidally adsorbed mineral salts by means of dialysis against acidulated water.

7. Process according to claim 5, in which the purification at the different stages of the alcoholic precipitation process is accompanied by rapid reduction of the temperature.

8. The process for preparing aldobiouronic acids from parts of plants of the genus Cecropia, which comprises extracting a polysaccharide material after it has been protected against the noxious action of enzymes and oxidases by diffusion at an elevated temperature not exceeding 100° C. in a medium consisting of a liquid selected from the group consisting of water and a weakly acidic aqueous solution, filtering the extract, precipitating the saccharide material from the filtrate by the addition of concentrated ethyl alcohol, hydrolyzing said polysaccharide material in an aqueous solution of a mineral acid having a concentration of 1% to 2.5% of acid, with heating at a temperature not exceeding 100° C. until the formation of the desired aldobiuronic acids has been achieved.

9. Process according to claim 8, in which the hydrolyzed liquor is gradually neutralized, at first by an hydroxide selected from the group consisting of alkali metals and alkali earth metals and then by a salt of basic reaction of the same metal as the applied hydroxide in aqueous medium, at a temperature in the range of 40° to 80° C.

10. Process according to claim 9, in which the neutralization of the hydrolyzed liquor is effected by means of barium hydroxide and barium carbonate, with formation of barium sulfate, by reaction of the same with the sulfuric acid used in the hydrolysis, the precipitated barium sulfate being separated by filtration from the hydrosoluble mixed barium salt of two aldobiuronic acids, viz., galactose-mannuronic acid and fucose-mannuronic acid, linked together by a glucosidic link.

11. Process according to claim 9, in which the filtrate, containing the barium salt of said aldobiuronic acids, is concentrated by evaporation in vacuo and said barium salt is therefrom precipitated by means of absolute ethyl alcohol and the separated salt is further purified by repeated solution in water and reprecipitation by ethyl alcohol, the thus purified residue being finally dehydrated.

12. Process for obtaining alkaloidic derivatives of the aldobiuronic acids prepared by the process of claim 1 comprising reacting acid radicals of said acids with an alcoholic solution of an alkaloid.

13. Process of obtaining derivatives of the salts of aldobiuronic acids prepared according to the process of claim 1, which comprises oxidizing, in the cold, salts of aldobiuronic acids selected from the group consisting of alkali metals and alkali earth metals, in the presence of the hydroxide of the corresponding metal, which provides a basic medium, by means of a stream of oxygen-containing gas which does not contain contaminants of the reaction, which is bubbled through the reaction mass.

14. Process according to claim 13, further characterized by neutralizing of the reaction mixture, after the absorption of oxygen has ceased, by means of a dilute acid, capable of precipitating the metal, whereupon the mixture is filtered, clarified and the clarified filtrate is evaporated to dryness in vacuo.

15. Process for obtaining alkaloidic derivatives of oxidized aldobiuronic acids, prepared according to claim 13, which comprises reacting an aqueous solution of the oxidation product with a solution of an alkaloid.

16. The process of obtaining a polysaccharide material from parts of plants of the species *peltata* and *hololeuca* of the genus Cecropia, which comprises grinding the parts of said plants and, after protecting the same against the noxious action of enzymes and oxydases by diffusion at a temperature substantially below 100° C. but not below 50° C. in a medium consisting of a liquid selected from the group consisting of water and a weakly acidic aqueous solution, filtering the extract, precipitating the saccharide material from the filtrate by the addition of concentrated ethyl alcohol and finally drying the polysaccharide precipitate.

17. The process of obtaining a polysaccharide material from parts of plants of the genus Cecropia, which comprises extracting the same after it has been protected against the noxious action of enzymes and oxidases by diffusion of a ground mass of such parts at an elevated temperature not exceeding 100° C. in an aqueous medium, removing color impurities by treating the filtrate with kieselguhr and activated carbon, precipitating the saccharide material from the decolorized filtrate by the addition of concentrated ethyl alcohol, further purifying the saccharide material by treating the same with acid at room temperature, next fractionally precipitating the material from a heated alcoholic solution of the same by rapidly cooling the solution, and eliminating colloidally adsorbed mineral salts by means of repeated dialysis against acidulated water.

References Cited in the file of this patent

Bennett: "Concise Chemical and Technical Dictionary," Chemical Publishing Co., N. Y. (1947), (page 25 relied on).

Ribeiro et al.: Chem. Abst., 45, 9620–1 (1951).

UNITED STATES PATENT OFFICE
CERTIFICATE OF CORRECTION

Patent No. 2,871,235 January 27, 1959

Vladimir Jan Mlousek de Jilovice

It is hereby certified that error appears in the printed specification of the above numbered patent requiring correction and that the said Letters Patent should read as corrected below.

Column 4, lines 61 and 62, for "sulfonic" read -- sulfuric --.

Signed and sealed this 11th day of August 1959.

(SEAL)
Attest:

KARL H. AXLINE
Attesting Officer

ROBERT C. WATSON
Commissioner of Patents